United States Patent Office 3,823,132
Patented July 9, 1974

3,823,132
FLAME-RETARDANT POLYURETHANE FOAMS
Felix H. Otey, Richard P. Westhoff, and Charles L. Mehltretter, Peoria, Ill., assignors to the United States of America as represented by the Secretary of Agriculture
No Drawing. Filed July 9, 1971, Ser. No. 161,312
Int. Cl. C07c 47/18
U.S. Cl. 260—210 R                              3 Claims

ABSTRACT OF THE DISCLOSURE

Highly flame-resistant rigid foams are obtained by the use of novel halogen-containing polyols in the polyurethane synthesis.

---

A nonexclusive, irrevocable, royalty-free license in the invention herein described, throughout the world for all purposes of the United States Government, with the power to grant sublicenses for such purposes, is hereby granted to the Government of the United States of America.

Background of the Invention

This invention relates to halogen-containing compounds which, when reacted with organic polyisocyanates, form polyurethane foam compositions which are highly flame resistant.

The preparation of polyurethanes involves reacting polyols with an organic polyisocyanate such as toluene diisocyanate, polymethylene polyphenylisocyanate, and p,p'-diphenylmethane diisocyanate. To produce an expanded or foamed product, a blowing agent is incorporated into the reaction mixture which causes the expansion of the polymer. These foamed products have many applications such as insulators and fillers. Because of new flammability standards and increasing public concern about fire safety, virtually all polyurethane foams should be flame resistant. Prior art has taught that flame resistance can be incorporated into polyurethanes by the use of fire retardants such as antimony trioxide, halogen-containing compounds, organo-phosphorous, and the like. These compounds substantially increases the cost or very severely affect the quality of rigid polyurethane foams (Modern Plastics, p. 69, October 1970). For example, many of these products greatly decrease the humid-age stabilty of foams—inferring that the foam would not retain its desired insulating and flame-resistant properties for an extended time when used in the walls and ceilings of homes and apartments, and appliances.

We have now discovered a method for producing an economically feasible polyol which, when incorporated into a polyurethane foam, provides a permanently bound flame retardant. This flame resistance is retained even after a 1-month exposure to 100 percent humidity at 70° C. (Table 1, infra).

In accordance with the invention, a polyol with properties suitable for perparing flame-resistant, rigid polyurethane foams was made by reacting α-D-glucose with alkyl alcohol in the presence of an acid catalyst such as sulfuric acid to form a mixture of allyl glucoside monomers, dimers, and oligosaccharides. The glucoside mixture was then reacted with 4 to 8 moles but preferably 4.0 to 6.5 moles of propylene oxide per mole of anhydroglucose units (AGU) using an alkaline catalyst such as potassium hydroxide. The propoxylated glucoside mixture was then reacted with enough bromine to combine with all of the available double bonds in the allyl groups. The polyol product (i.e., the halogenated product of the propoxylated glucoside mixture) was then incorporated into rigid polyurethane foams by well-known techniques. All of the foams had fine cells and other properties that make them desirable for insulation and filler applications.

It is evident from the data in Table 1 (infra) that the polyols yield non-burning or self-extinguishing foams without the addition of any other flame-proofing additive.

Detailed Description of the Invention

The following series of reaction steps illustrates the preparation of the major polyol product.

Step 1.

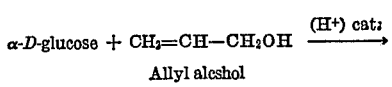

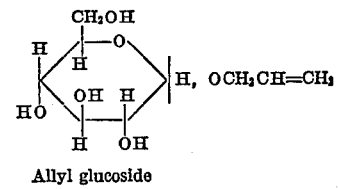

Allyl glucoside

Step 2.

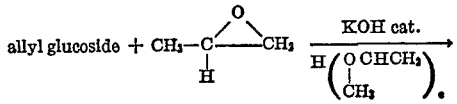

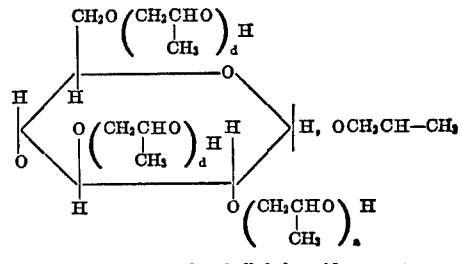

Propoxylated allyl glucoside

Step 3.

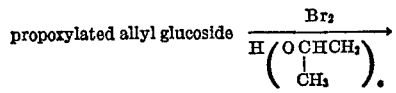

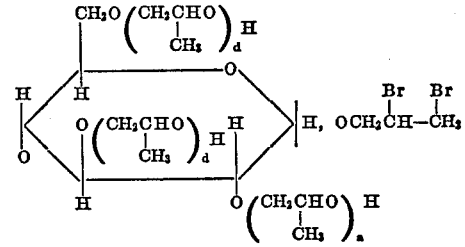

Brominated propoxylated allyl glucoside $a$, $b$, $c$, and $d$ may be any integer including zero such that their combined value is not less than 4 or greater than 8. Compound I above constitutes from about 70 to 90 percent of the final polyol product obtained from the synthesis. The remainder is composed of less than 1 percent free glucose and from about 10 to 30 percent dimers and oligosaccharides which differ from compound I only in that the molecules contain two or more AGU's connected through a hemiacetal linkage. Compound I and the polyol products are characterized as having hydroxyl numbers in the range of 260 to 380; they are liquid and have 19 to 26 percent bromine. The polyol product is used without further purification in the process of producing fire-retardant polyurethane foams. However, compound I could be obtained in essentially pure form by separation from the final polyol product or by separating the allyl glucoside monomer from step 1 (i.e., the allyl glucoside containing only one AGU) and performing the remaining reaction steps on the essentially pure glucoside. The above separations could be accomplished by known procedures such as column or gas chromatography. Purified compound I is useful in the same way as the instant polyol product.

In the first step of the instant method, $\alpha$-D-glucose is reacted with allyl alcohol in the preferred ratios of 0.05 to about 0.2 mole of glucose per mole of allyl alcohol. Increasing glucose concentration has the effect of decreasing the yield of allyl glucoside monomer and increasing the yields of allyl glucoside dimers and oligosaccharides. Glucose to allyl alcohol molar ratios of 0.01:1 and lower can be used when greater yield of allyl glucoside monomer is desired. The reaction is catalyzed by hydrogen ions from sources such as mineral acids, $BF_3$, or acid resins in the preferred ratio of from about 2 mmoles up to 9 mmoles of acid per mole of allyl alcohol. At acid concentrations of greater than 9 mmoles, the product takes on an undesirable amber color; while at concentrations of less than 2 mmoles, the reaction becomes impractically slow. Within the preferred range of catalyst concentration and at temperatures of between 75° to 95° C., no significant differences in yields of allyl glucoside monomer was observed. However, reaction rates increased with increased catalyst concentration and temperatures.

Propylene oxide was reacted with the allyl glucoside mixture in the laboratory at atmospheric pressure at temperatures of from about 150° C. to 170° C. However, in an industrial situation, it would be more practical to perform this reaction in a pressurized system which would allow the use of lower temperatures. For example, at a propylene oxide pressure of 30 p.s.i., the reaction temperature is between 120° C. and 140° C.

A ratio of from about 4 to 8 moles of reacted propylene oxide per mole AGU of allyl glucosides is preferred to obtain the properties useful in preparing polyurethane foams. Since the reaction involves not only addition to the glucoside but also polymerization of the added propylene oxide, the theoretical amount of addition is essentially unlimited. Those skilled in the art will probably find applications for brominated and unbrominated propoxylated allyl glucosides containing widely varying amounts of reacted propylene oxide other than those preferred in the instant method.

Step 3 is a straightforward addition of halogen to double bonds. Halogen in this context is taken to include only bromine, chlorine, and iodine. Fluorine cannot be used to prepare vicinal difluorides because it causes extensive fragmentation of the molecule. Bromine and chlorine are essentially equivalent. Vicinal diiodides tend to be unstable, eliminating iodine and regenerating the double bond. Bromine is the preferred halogen.

The reason for the exceptional stability and flame resistance characteristic of polyurethane foam products made from said polyol is not fully understood. However, it is believed to be due in part to: (1) the highly stable, centrally located position of the halogen atoms in the polyol molecules; (2) the rigid, cyclic structure of glucoside moiety; and (3) the rigidity contributed to the polyurethane molecule by the 10 to 30 percent higher molecular weight oligosaccharide structure. The rigidity contributed by cyclic structures and high molecular weights prevent melting of foam when exposed to a flame, thereby preventing flame spread due to dripping or running of the foam when brought in contact with a flame. Furthermore, this bromine-carbohydrate structure causes a rigid carbon structure to develop when the foam is exposed to a flame. This carbon structure helps shield the foam from further flame spread. Equally important to the low-flame spread is the stability of the new foam to high temperature-high humid-aging as demonstrated by low volume and weight changes and retention of flame resistance of the foams during extended aging at 70° C. and 100 percent relative humidity and at 100° C. dry oven aging.

The term "non-burning" and "self-extinguishing" are used in accordance with the definitions set forth in "Tentative Method of Test for Flammability of Plastics Foams and Sheeting," ASTM D1692–59T.

In order to disclose more clearly the nature of the present invention, specific examples are set forth here below.

EXAMPLE 1

Step 1. Allyl Glucoside Preparation.—In a 4-necked, 1-liter flask equipped with a glass-sleeve Teflon stirrer, thermometer, nitrogen inlet, condenser, and heating mantle was mixed 500 cc. (7.4 moles) allyl alcohol, 1.5 cc. concentrated $H_2SO_4$, and 126 g. (0.7 mole) powdered anhydrous $\alpha$-D-glucose. The mixture was heated rapidly with stirring so that the temperature reached 92° C. in 10 minutes and a clear solution developed in about 15 minutes. The solution was kept at 92° C. for 2 hours, and then the condenser was placed downward to allow about 50 cc. of allyl alcohol to distill out as the temperature was raised and held at about 95° C. for 15 minutes. Then the solution was cooled to 50° C. and mixed with 50 cc. of aqueous potassium hydroxide solution (5.7 g. KOH, dry basis). This amount of KOH neutralized the $H_2SO_4$ catalyst and was calculated to leave 2.6 g. of KOH to serve as catalyst for the subsequent propoxylation.

The water and excess allyl alcohol were then removed by vacuum distillation (10 to 20 mm. Hg) as the product temperature was slowly increased to about 130° C. Yield was 152.8 g. (this is equivalent to 145.4 g. allyl glucoside product, exclusive of inorganics). Iodine value was 101 (theory for pure allyl glucoside, 115). Quantitative gas chromatographic analysis showed the organic portion to contain 47.6 percent allyl $\alpha$-D-glucoside, 22.4 percent allyl $\beta$-D-glucoside, less than 1 percent free glucose, and about 30 percent dimers and oligosaccharides.

Step 2. Propoxylation of Allyl Glucosides.—In a 4-necked, 1-liter flask equipped with condenser, stirrer, thermometer, nitrogen inlet, and dropping funnel, 145.1 g. (exclusive of inorganics) of the glucoside mixture from step 1 above was heated to 160° C. Then at 160° C. and with good stirring, 175.6 g. of propylene oxide was added dropwise over 3.5 hours. The product was then dissolved in 800 cc. water and deionized by passing through a cation exchanger column (Dowex 50; 3 by 1.25 inches) and then through an anion exchanger column (Doulite A–4; 8 by 1.25 inches) and finally decolorized one time with 6 g. of activated charcoal and concentrated in vacuo (5 to 10 mm. Hg) at 100° C. The resulting product was a viscous, amber, clear liquid. It had an iodine value of 44 and contained an average of 4.3 moles of reacted propylene oxide per mole of AGU.

Step 3. Bromination of the Propoxylated Allyl Glucosides.—Into 200 cc. of chloroform was dissolved 225 g. of the propoxylated allyl glucoside from step 2 above. Then 64 g. of bromine (the amount calculated to react with this amount of propoxylated glucoside based on the iodine value plus a slight excess) in 30 cc. chloroform was added dropwise as the solution was stirred and kept at 10° C. The bromine addition required 36 minutes. The chloroform solution was then washed twice with 75-cc. portions of saturated $NaHCO_3$. After draining off the aqueous $NaHCO_3$ solution, the chloroform solution was concentrated in vacuo (10 to 20 mm. Hg) at 70° C. to yield 282.3 g. of viscous, amber, clear liquid. The product had a hydroxyl number of 304 and contained 22 percent bromine. It contained an average of 4.3 moles of reacted propylene oxide per mole of AGU.

EXAMPLE 2

An allyl glucoside mixture was prepared by exactly the same procedure as given in Example 1, step 1, above. It had an iodine value of 97 and contained about 46 percent allyl $\alpha$-glucoside, 22 percent allyl $\beta$-D-glucoside, less than 1 percent glucose, and about 31 percent dimers and oligosaccharides. The glucoside mixture was then reacted with 236 g. of propylene oxide by the same procedure described in Example 1, step 2, above. This propoxylated product had an iodine value of 36 and contained about 5.8 moles of reacted propylene oxide per mole of AGU. The iodine value indicated that 100 g. of the product could combine with about 22.7 g. of bromine. The propoxylated product (250 g.) was mixed with 60 g. of bromine by the same procedure described in Example 1, step 3, above. The final product contained 19 percent reacted bromine and had an average of 5.8 moles of propylene oxide reacted per mole of AGU and had a hydroxyl number of 271.

EXAMPLE 3

An allyl glucoside mixture was prepared by exactly the same procedure as given in Example 1, step 1, above. It had an iodine value of 101 and contained about 47 percent allyl $\alpha$-D-glucoside, 22 percent allyl $\beta$-D-glucoside, less than 1 percent glucose, and about 30 percent dimers and oligosaccharides. The glucoside mixture was reacted with 4.9 moles of propylene oxide per mole of AGU by the same procedure described in Example 1, step 2, above. The propoxylated product had an iodine value of 42. The product (200 g.) was then reacted with 53.2 g. of bromine by the same procedure described in Example 1, step 3, above. The final polyol contained 21 percent bromine and had an average of 4.9 moles of propylene oxide reacted per mole of AGU and had a hydroxyl number of about 305.

EXAMPLE 4

Allyl alcohol (1000 cc.; 14.8 moles) was reacted with 126 g. (0.7 mole) $\alpha$-D-glucose by the procedure of Example 1, step 1, above. The glucoside product weighed 153 g. and contained about 55 percent allyl $\alpha$-D-glucoside, 25 percent allyl $\beta$-D-glucoside, 1 percent free glucose, and about 19 percent dimers and oligosaccharides.

The glucoside product was then reacted with 172.4 g. of propylene oxide (4.2 moles per AGU) by the procedure of Example 1, step 2, above. Then 250 g. of this propoxylated product was combined with 79.6 g. bromine by the procedure of Example 1, step 3, above. The brominated polyol product contained 23.8 percent bromine.

EXAMPLE 5

Rigid polyurethane foams were prepared according to the formulations set forth in Table 1. Quantity of basic ingredients was adjusted to maintain a constant NCO to OH ratio of 1.05 to 1.09. Ingredients were poured together, mixed with a high-speed air stirrer for about 20 to 40 seconds, and allowed to foam in a 7 x 7 x 3-inch cardboard box.

TABLE 1.—FOAM FORMULATIONS AND FLAMMABILITY TEST

| Final polyol from Example number | 1 | 2 | 3 | 4 |
|---|---|---|---|---|
| Ingredients, weight, grams: | | | | |
| Polyol | 65 | 68 | 65 | 70 |
| DC 202 [1] | 1.2 | 1.2 | 1.2 | 1.2 |
| Freon 11 [2] | 19.2 | 18.9 | 19.3 | 20.4 |
| DABCO [3] | 0.6 | 0.6 | 0.6 | 0.6 |
| DMEA [4] | 0.6 | 0.6 | 0.6 | 0.6 |
| DBTDL [5] | 0.1 | 0.1 | 0.1 | 0.1 |
| PAPI [6] | 52.7 | 47.9 | 52.8 | 58.5 |
| Properties: | | | | |
| Density, lb./cu. ft. | 1.9 | 2.0 | 1.9 | 1.88 |
| Flammability test after aging: [7] | | | | |
| 1 month at 25° C., 50% RH | NB | SE | NB | NB |
| 1 week at 100° C., dry oven | NB | SE | NB | NB |
| 1 month at 70° C., 100% RH | NB | SE | NB | NB |

[1] A silicone-based foam stabilizer made by Dow Corning Corporation.
[2] Blowing agent—trichlorofluoromethane.
[3] A catalyst, triethylenediamine, made by Houdry Process and Chemical Company.
[4] A catalyst, dimethylethanolamine, made by Union Carbide Chemicals Company.
[5] A catalyst, dibutyltindilaurate, made by Union Carbide Chemicals Company.
[6] Polymethylene polyphenylisocyanate made by Upjohn Company.
[7] ASTM D1692-59T: NB means non-burning; SE means self-extinguishing.

We claim:
1. A brominated propoxylated allyl glucoside comprising the following structure:

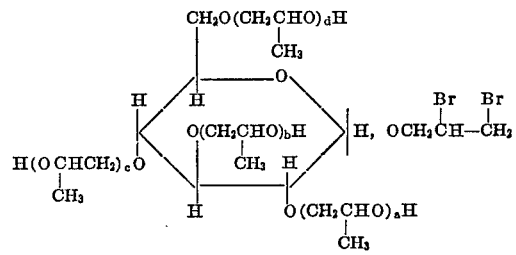

where $a$, $b$, $c$, and $d$ are any integer including zero and $a+b+c+d$=from 4 to 8.

2. A propoxylated allyl glucoside comprising the following structure:

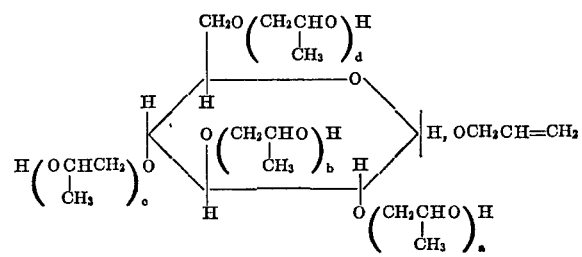

where $a$, $b$, $c$, and $d$ are any integer including zero and $a+b+c+d$=from 4 to 8.

3. A brominated propoxylated allyl glucose composition comprising a mixture of from 70 to 90 percent of a compound having the following general structure:

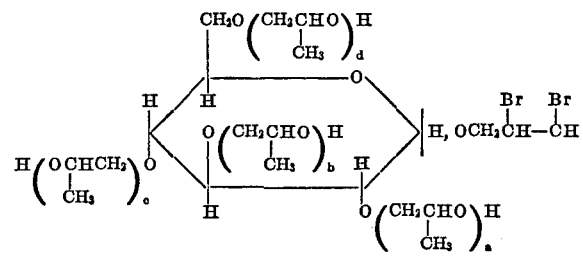

where $a$, $b$, $c$, and $d$ are any integer including zero and $a+b+c+d$=from 4 to 8; and from 10 to 30 percent dimers and oligosaccharides which differ from said compound only in that said dimers and oligosaccharides consist of a plurality of anhydroglucose units connected through hemiacetal linkages; said composition being characterized as having hydroxyl numbers of from 260 to 380, as being a liquid, and as containing from 19 to 26 percent bromine.

References Cited

UNITED STATES PATENTS

| | | | |
|---|---|---|---|
| 3,250,813 | 5/1966 | Stephenson | 260—210 R |
| 3,340,239 | 9/1967 | Schweiger | 260—210 R |
| 3,402,169 | 9/1968 | Jackson | 260—210 R |
| 3,445,525 | 5/1969 | Bormann et al. | 260—210 R |

OTHER REFERENCES

Noller, "Chem. of Organic Compounds," 3rd Ed., 1965, p. 778, W. B. Saunders Co., Philadelphia.

JOHNNIE R. BROWN, Primary Examiner

U.S. Cl. X.R.

260—2.5 AS